United States Patent [19]

Acres

[11] Patent Number: 4,682,745
[45] Date of Patent: Jul. 28, 1987

[54] PRELOADABLE VECTOR SENSITIVE LATCH

[75] Inventor: William R. Acres, Houston, Tex.

[73] Assignee: The United States of America as represented by the Administrator of the National Aeronautics and Space Administration, Washington, D.C.

[21] Appl. No.: 783,888

[22] Filed: Oct. 3, 1985

[51] Int. Cl.⁴ .................................................. B64G 1/64
[52] U.S. Cl. .............................. 244/161; 292/DIG. 49; 292/201; 292/64
[58] Field of Search ............... 244/161; 24/490, 463; 292/DIG. 49, 201, DIG. 71, DIG. 57, 64

[56] References Cited

U.S. PATENT DOCUMENTS

| | | | |
|---|---|---|---|
| 2,186,795 | 1/1940 | Anderson | 292/DIG. 49 |
| 2,316,401 | 4/1943 | Burke | 292/DIG. 71 |
| 2,325,225 | 7/1943 | Burke | 292/DIG. 49 |
| 3,193,213 | 7/1965 | Eberwine | 244/1 |
| 3,201,065 | 8/1965 | Dunn | 244/1 |
| 3,207,273 | 9/1965 | Jurin | 292/201 |
| 3,391,881 | 7/1968 | Maltby | 244/1 |
| 3,443,773 | 5/1969 | Blumrich et al. | 244/1 |
| 3,564,564 | 2/1971 | Paine | 24/263 |
| 3,608,848 | 9/1971 | Cantor | 244/1 |
| 3,722,936 | 3/1973 | Stubert | 292/64 |
| 3,737,117 | 6/1973 | Belew | 244/161 |
| 3,820,741 | 6/1974 | Ratcliff | 244/161 |
| 4,056,276 | 11/1977 | Jarvis | 292/DIG. 49 |
| 4,268,076 | 5/1981 | Itoi | 292/201 |

Primary Examiner—Jeffrey V. Nase
Assistant Examiner—Lynn M. Fiorito
Attorney, Agent, or Firm—Hardie R. Barr; John R. Manning; Edward K. Fein

[57] ABSTRACT

The invention relates to a preloadable vector-sensitive latch which automatically releases when the force vector from a latch member reaches a specified release angle. In addition, it contains means to remove clearance between the latched members and to preload the latch to prevent separation at angles less than the specified release angle. The latch comprises a triangular main link (77), a free link (74) connected between a first corner of the main link and a yoke member (72), a housing (82), and an actuator (71) connected between the yoke member and the housing. A return spring bias means (70) connects the main link to a portion of the housing. A second corner of the main link is slidably and pivotally connected to the housing via a slot (81) in a web portion of the housing. The latch housing has a rigid docking ring (79) alignable with a mating locking ring (75) which is engageable by a locking roller (78) journalled on the third corner of the triangular main link.

14 Claims, 12 Drawing Figures

DIRECTION OF LATCHED
LOAD APPLICATION

PRELOADABLE VECTOR SENSITIVE LATCH

ORIGIN OF THE INVENTION

The invention described herein was made by an employee of the United States Government and may be manufactured and used by or for the Government of the United States of America for govenmental purposes without payment of any royalties thereon or therefore.

TECHNICAL FIELD

The utilization of latching mechanisms is universal to the mechanical arts, with applications ranging from under the seas to outer space. As a well-known example, the Apollo-Soyuz Test Program was a joint endeavor of The United States of America and the Union of Soviet Socialist Republics whereby each nation resolved to formulate specifications and develop spacecraft that will have compatible docking/berthing systems.

The resolve by both nations to create a compatible docking/berthing system was only a first step in a trend toward achieving maximum utility and flexibility from various space programs. The requirements of a compatible docking/berthing mechanism were (1) that it operate on and in conjunction with the space vehicle, i.e. design and concept, of each country. (2) that it be of such a simple design that it could be fabricated in each country and yield a product that was in fact compatible, and (3) that it be a "fail-safe" system to the extent that man can create such a system. A later space application of latching mechanisms is the docking/berthing system of the United States' Space Station Program which is being designed to accommodate the docking/berthing of spacecraft originating from various entities, both within and outside of the United States.

A principal feature of a docking/berthing mechanism is the latching mechanism which is employed to perform the initial connection between two spacecraft and maintains such connection until the relative motion between the space-craft is dynamically damped and the spacecraft are drawn together. The docking/berthing mechanism, of course, is a portion of the vehicle, but it performs a very specialized function in aligning the two vehicles and holding that alignment until there is a structural juncture of the vehicles. The operation of the latching mechanism is the critical aspect of "fail-safe" performance.

The purpose of a latching mechanism is to hold the two space vehicles that are being docked/berthed in a stable relationship, while the actual coupling of the two vehicles is carried out by structural connection. The docking/berthing mechanism performs the additional task of aligning the two vehicles for coupling. The latching mechanism will latch only when the two vehicles are aligned within a predetermined tolerance and have approached one another in the proper alignment.

The latching mechanism may be located on each of the docking/berthing mechanisms and become operational when the latch member comes in contact with a latching surface on the docking/berthing mechanism on the opposing space vehicle.

BACKGROUND ART

Prior latching mechanisms have included a simple latch which rotates about a single pivot, tracing a circular path on the mating surfaces. In operation the prior capture latch would be maintained in an engaged configuration by a biasing means, such as a torsional or tension spring. As the leading surface of the mating docking mechanism contacted the capture latch, the latch was depressed until the mating surface of the mating docking/berthing mechanism came into cooperative alignment with the capture latch. The capture latch then resumed its engaged position and engaged the mating surface, thus preventing withdrawal of the mating docking/berthing mechanism. It can be appreciated that at least two substantially opposed capture latches would have to be so engaged to secure the two docking/berthing mechanisms in place together, to achieve stabilization of the two vehicles, relative to each other and allow structural connection.

Should one side of the docking/berthing mechanism not fully seat, the opposing latch is required to release or not trap the docking/berthing mechanism in order to allow another attempt at docking/berthing. The prior capture latches were not easily released under these circumstances since the load would be on the latch and the frictional component of the load opposes the releasing force direction. Thus, it is often necessary to relieve the load before the latch can be released by causing a gap between two opposing surfaces.

In a similar fashion, the release of the fully seated docking/berthing mechanisms for separation of the spacecraft is not facilitated by the prior capture latches because of the load on the latches and the resultant frictional component.

A vector sensitive latch is described in U.S. Pat. No. 3,820,741 and this latch was used in the Apollo-Soyuz Test Program docking/berthing system. That system incorporated three latches fastened to a docking/berthing ring and automatically released if the mating ring was not fully captured and separated by a set amount. In the fully captured condition, a small clearance between the latch roller and the latch would set. Structural latches were thus provided to remove the clearance and to preload the mating rings in order to prevent separation. Not only was a second set of latches required but in addition means to activate and release the second set of latches thus incorporating additional unnecessary weight and complexity to that particular system.

DISCLOSURE OF THE INVENTION

The invention relates to a preloadable vector-sensitive latch which automatically releases when the force vector from a latch member reaches a specified release angle. In addition, it contains means to remove clearance between the latched members and to preload the latch to prevent separation at angles less than the specified release angle. The latch comprises (1) a triangular main link, (2) a free link connected between a first corner of the main link and (3) a yoke member, (4) a housing, and (5) an actuator connected between the yoke member and the housing. A bias means such as a return spring mechanism connects the main link to a portion of the housing. A second corner of the main link is slidably and pivotally connected to the housing via a slot in a web portion of the housing. The latch housing has a rigid docking/berthing ring alignable with a mating locking ring which is engageable by a locking roller journalled on the third corner of the triangular main link. The free link is so called because it is "free", i.e., not attached to a relatively "fixed" member such as the housing, and is thus capable of both translating and rotating with respect to the housing as opposed to only rotating about a point fixed on the housing.

The latching mechanism of the present invention overcomes the problem of the prior capture latches in that is is easily released when there is an improper seating because of a novel linking means which has created favorable vector considerations relating to the load and the latch member. These same vector considerations also overcome the problem of releasing a fully seated docking mechanism, in that the load need not be relieved in order to release the latching mechanisms and in fact the presence of a load on the instant latch member can actually facilitate the uncoupling of the docking mechanism.

Among the various advantages of the present invention are the simple design which will allow it to be fabricated by different spacecraft manufacturers under, possibly, very different fabrication techniques to produce essentially the same device having the same mode and manner of operation. Another advantage is the adaptability of the present docking mechanism to two separately evolved spacecraft without impairment of, or interference with, the normal functioning of either spacecraft. A further advantage of the present invention is an essentially "fail-safe" latching mechanism. Further advantages are the ease of disengaging the latch members from either the engaged mode or from a misaligned docking attempt.

Another advantage of the present latches over the prior art is in the final step of engaging the latching surface, where the present latch member rotates out of the housing and downward toward the latching surface, and can not bind with the latching surface, whereas the prior art latches parallel to the latching surface and can bind therewith.

The latch mechanism of the present invention is also particularly well adapted for use in "inner" space, i.e., underwater exploration and development, since many of the same considerations such as the simple and "fail-safe" nature of the latching mechanism and the universal adaptability of the docking mechanism are important. Additionally, the present latching mechanism will be useful in such sensitive operations as air-to-air refueling of aircraft and the like.

Although the present invention in regard to the latching mechanism and associated mechanisms has been described with regard to a utilization in space for the docking/berthing of spacecraft, or in relation to two free and independently movable objects, it is to be understood that the present invention has other utilities which will be obvious, for example, in locks or in situations where the latch must be released against the force of a heavy load.

These and other advantages of the present latching mechanism and docking/berthing mechanism will be apparent from the drawings and the description of the invention.

BEST MODE FOR CARRYING OUT THE INVENTION

Figure 1:
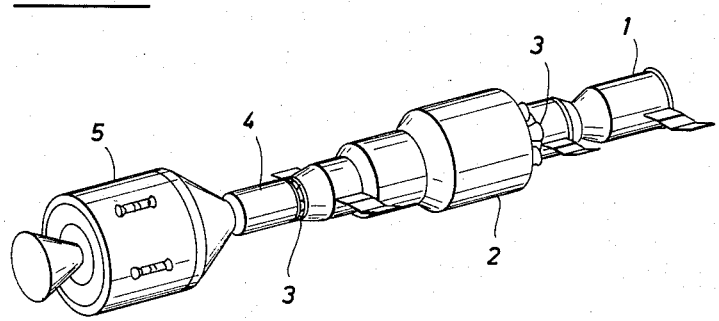
FIG. 1 is a perspective view of a spacecraft configuration in a docking/berthing mission as illustrated in the prior art.

FIG. 1 depicts a space link-up wherein the suyuz 1 is attached to a Salyut-type spacecraft 2 by means of a docking mechanism 3. The Salyut-type spacecraft 2 is in turn docked with a docking module 4 by means of a docking mechanism 3. The docking module 4 is in turn engaged with the Apollo command and service modules 5. It should be appreciated that the docking mechanism 3 is duplicated on each of the two opposed vehicles. For example, there is a docking mechanism on the docking module 4 engaged with a duplicated docking mechanism mounted on the Salyut-type spacecraft 2.

Figure 2:
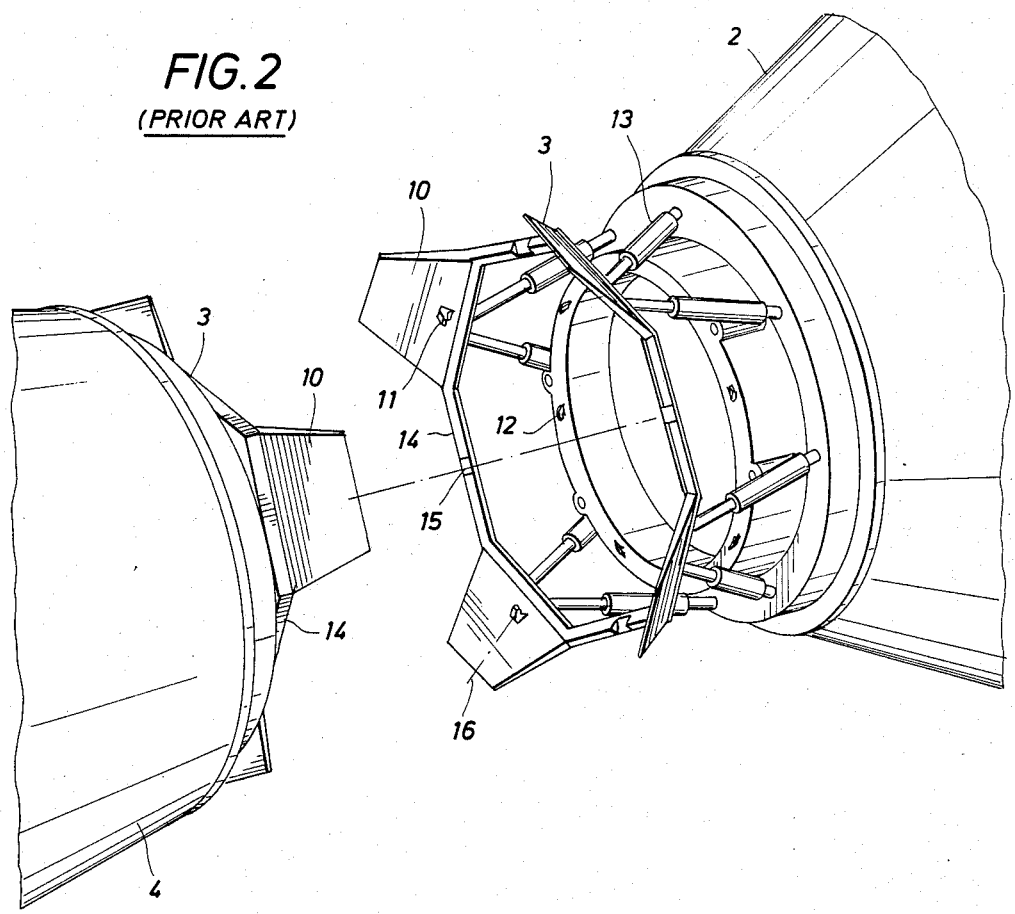
FIG. 2 is a perspective view of two docking/berthing mechanisms in a docking attitude as illustrated in the prior art.

Referring to FIG. 2, this concept of duplication of the docking mechanisms on both vehicles can be more clearly seen. The Salyut-type spacecraft 2 is located on the right with the docking mechanism attached thereto, and to the left aligned in an engaging posture is the docking module 4 with its corresponding or duplicate docking mechanism 3 rotated one-eighth of a turn from the position of the docking mechanism on the Salyut. The docking mechanism is composed of a ring 14 which is octagonal in configuration. Mounted at alternating sites on the ring are alignment fingers 10, so that there are four such fingers 10 on the ring 14. Located on each finger is the latch member 11 which is located approximately on a center line 16 through the finger. Located on each of the other four portions of the ring at approximately the center of each of these portions of the ring is a latching surface 15. Latching surface 15 is so situated as to be in alignment with latch member 11 when the two docking mechanisms 3 are brought into engaged position. During engagement, the fingers 10 of the docking mechanism on the docking module 4 will be seated between the fingers 10 on the docking mechanism of the Salyut-type spacecraft 2. There may be eight engagements of latch members 11 with latching surfaces 15, although only two substantially opposed matings are necessary in order to secure the two docking mechanisms together. The docking mechanism 3 is attached to the spacecraft by means of attenuators 13. The attenuators 13 shown here are hydraulic. However, electromechanical attenuators may be employed. After the docking mechanism 3 on the docking module 4 has engaged the docking mechanism 3 on the Salyut-type spacecraft, the attenuators are activated to bring the two spacecraft structures together, at which time the structural latches 12 are engaged. Thus it can be seen that the purpose of the docking mechanism is to make the initial contact between the two spacecraft, to secure the two spacecraft and to maintain this initial connection until the relative motion between the spacecraft is dynamically dampened, and to provide a posture in which the spacecraft can be structurally joined together.

Figure 3:
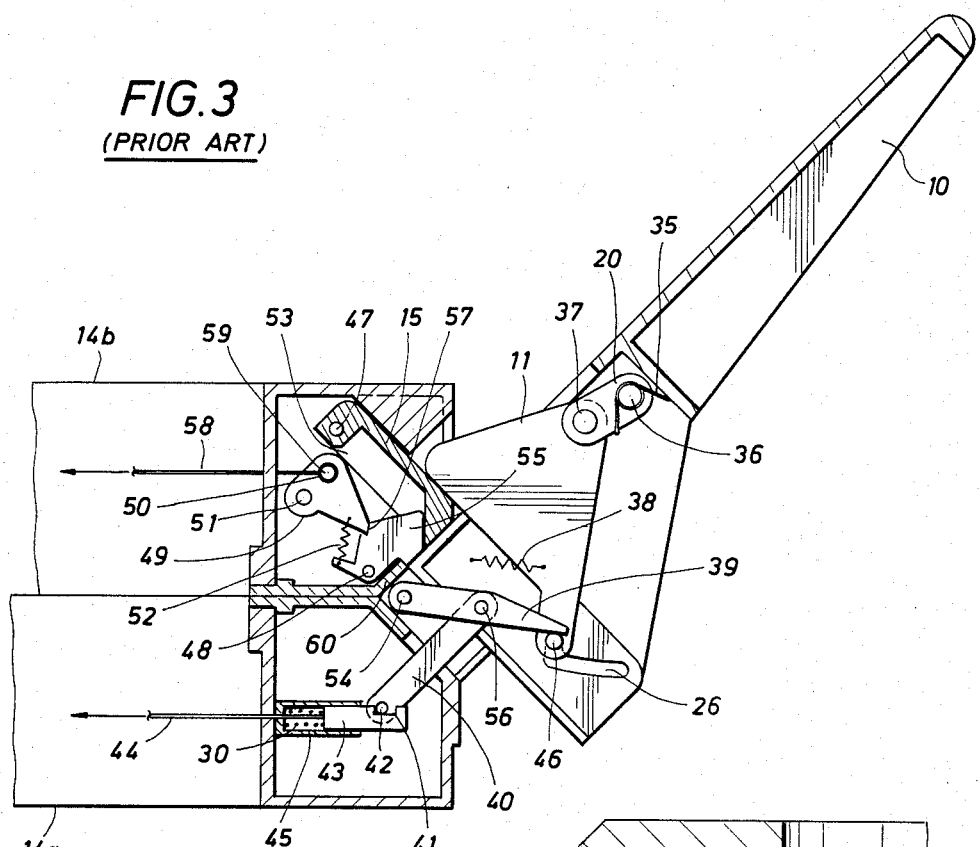
FIG. 3 is a cross-sectional elevation of the latching mechanism of the prior art in the engaged mode.

In FIG. 3 the latch member 11 is in the engaged mode engaging latching surface 15. The finger 10 is mounted on ring 14, and finger 10 may be hingedly mounted in order to be folded inwardly on the ring when not in use or, for example, during launch in order to fit inside of the launch shroud. In the engaged mode, the latch member is fully extended from the finger 10 wherein it is mounted. The latch member 11 is mounted by means of a rotational link 20 pivotally attached to latch member 11 by pin 37. The linking member is in turn pivotally mounted on pin 36, which is affixed to the finger 10. Torsional spring 35 is biased against a portion of finger 10 and tends to urge the linking member 20 and the latch member 11 outward from the finger 10. Also aiding in maintaining the engaged position of latch member 11 is a tension spring 38 which is attached to finger 10 and to the latch member 11. Cam 46 is mounted at the lower end of latch member 11, said cam being situated to move along or through slot 26.

The latch member 11 may be activated, that is, disengaged, by lever 39 pivotally mounted in finger 10 on pin 54. Lever 39 is actuated by arm 40 which is seated in notch 41 in bar 43 by means of a pin 42. Bar 43 is held in place by holder 45 and attached to cable 44, by which it is operated. The release is actuated by movement of cable 44 in the direction of the arrow.

Referring again to FIG. 4, a second ring 14b is seated against the first ring 14a on which finger 10 is mounted. The latch member 11 is seated against latching surface 15. The two surfaces which contact are substantially parallel. This is important since any separating force between the two fully engaged rings will tend to apply a force to latch member 11. The leading edge 60 of ring 14b is seated against the surface of ring 14a. The latching surface 15 is held in place by latching surface lock member 55, which is pivotally mounted on pin 48 in ring 14b. Latching surface lock member 55 is a portion of a mechanism which allows the latching surface 15 to be the means of release of the two engaged vehicles. The latching surface lock member 55 is itself held in place by release member 49, which is fitted into shoulder 57 located on latching surface lock member 55. The two members 49 and 55 are partially held in this configuration by tension spring 52. In addition to the tension spring 52, any force applied against latching surface 15 will tend to force latching surface lock member 55 against release member 49, thus seating release member 49 more securely into shoulder 57.

Release member 49 is part of a mechanism designed to allow the two rings to be disengaged by release of the latching surface mechanism. The release member 49 is pivotally mounted in ring 14b on pin 51. Cable 58 is attached to release member 49 by means of a bushing 59 which is fixedly attached to cable 58, said bushing being seated on a shaft 50 mounted on release member 49. Also in conjunction with this release mechanism, latching surface 15 is equipped with a chamber 53 into which latching surface lock member 55 moves during the release operation. In addition, latching surface 15 is pivotally attached in ring 14b. The release mechanism is actuated by movement of cable 58 in the direction indicated by the arrow.

The preloadable vector sensitive latch of the present invention automatically releases when the force vector from the latched member reaches a specified release angle and in addition removes any clearance between the latched members, and preloads the member to prevent separation.

The present latch incorporates all of the essential features of the above described vector sensitive latch of U.S. Pat. No. 3,820,741, and adds the feature to preload the latched members with a preselected and predetermined force. The preload force holding the latching members together is controlled by the force exerted by the actuator. The preload force on the latched member is caused by a smaller force exerted by the actuator. The present latch includes five major components as shown in FIGS. 4-12 and consisting of a main link 77, a free link 74, a yoke member 72, the housing 82, and means to rotate the yoke member. The preloading feature allows the latch to be used in many systems where the prior art vector sensitive latch is unsuited. In general, it can be used in any remotely controlled or automatic latching application. Means of applying the preloading force, also herein called actuator means, may be by means of a spring, an actuator, a gear motor or other suitable means, and its release can either be achieved by the same means or done manually. Several embodiments of the preloadable latch as shown in FIGS. 4-12 are contemplated herein. Thus, the housing 82 may be separate and attached to one of the mating latching members or primary member 79 or it may be an integral part of only one latching member. The slot 81 that controls movement of the main link 77 may be machined in the housing 82, or in the main link 77. Movement of the yoke 72 to remove the clearance and to preload the latch may be accomplished by an actuator 71 as shown in FIGS. 4-12 or by other suitable means. The contact point between the latch and the latched member may be a roller 78 as shown, or a surface that is an integral part of the main link 77. The yoke 72 may be replaced by an element which rotates about the yoke pivot point 76 to cause movement of the free link connecting point 73 for clearance removal and preloading.

Other advantages of the preloadable vector sensitive latch include the removal of clearance between the latch and latched member, the preloading of the latched member for eliminating a separate system for that purpose, and a remote release for automatic latching systems that includes automatic release if the latching members become misaligned by a specified amount.

As noted above, the preloadable vector sensitive latch operates much like the vector sensitive latch of U.S. Pat. No. 3,820,741 with the exception that it in addition removes the clearance between the latch roller 78 and the latched member 75 and exerts a preloading force on that member to prevent separation.

Figure 4:
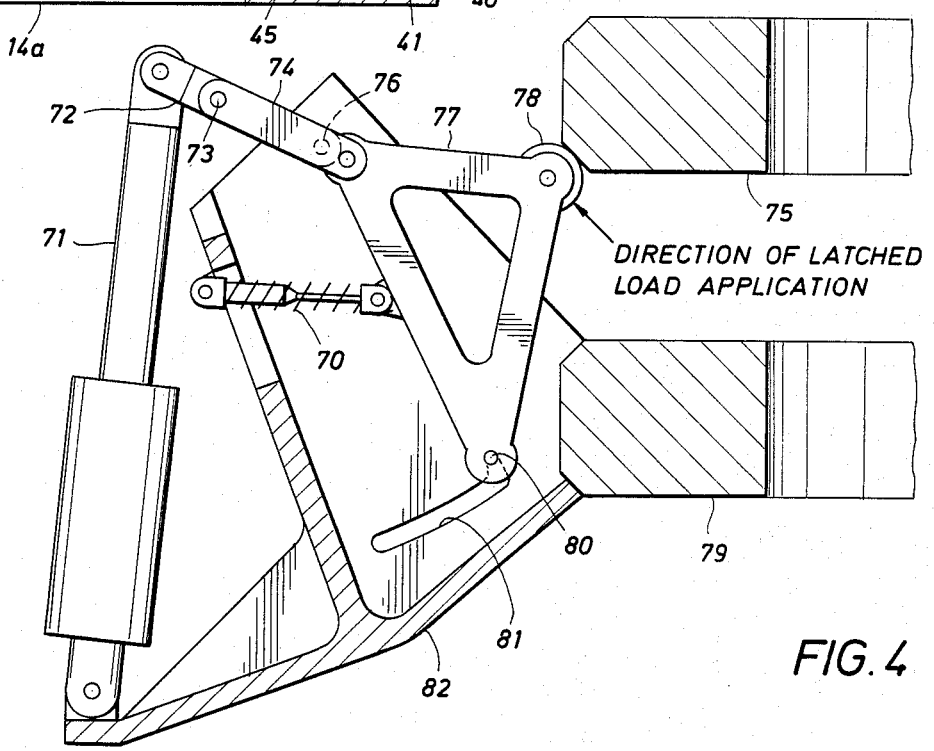
FIGS. 4–12 are cross-sectional elevational views of the latching mechanism of the present invention in various operational modes.

Referring to FIG. 4, the latch includes a main link 77, a latch roller 78, a free link 74, yoke 72, actuator 71, return spring bias means 70, and housing 82. The main link 77 is triangular in shape, and has a slider pin 80 located adjacent one apex that confines motion to the shape of slot 81 in housing 82. The latch roller 78 is located near a second apex, and one end of the free link 74 is attached adjacent the other. The latch roller 78 contacts the latched member 75, and the opposite end of the free link 74 is attached to the center of the yoke 72 by pivot pin 73. The yoke 72 is attached to the housing 82 by yoke pivot pins 76 and to the actuator 71 at the opposite end. The return spring bias means 70 returns the main link 77 to the normally latched position, and the actuator 71 rotates the yoke 72 to either the released, normal, or clearance removal and preloading positions, and supplies a force that produces the preload force between the latch roller 78 and the latched member 75. The housing 82 is attached to the primary member 79 which includes the docking ring.

Figure 5:
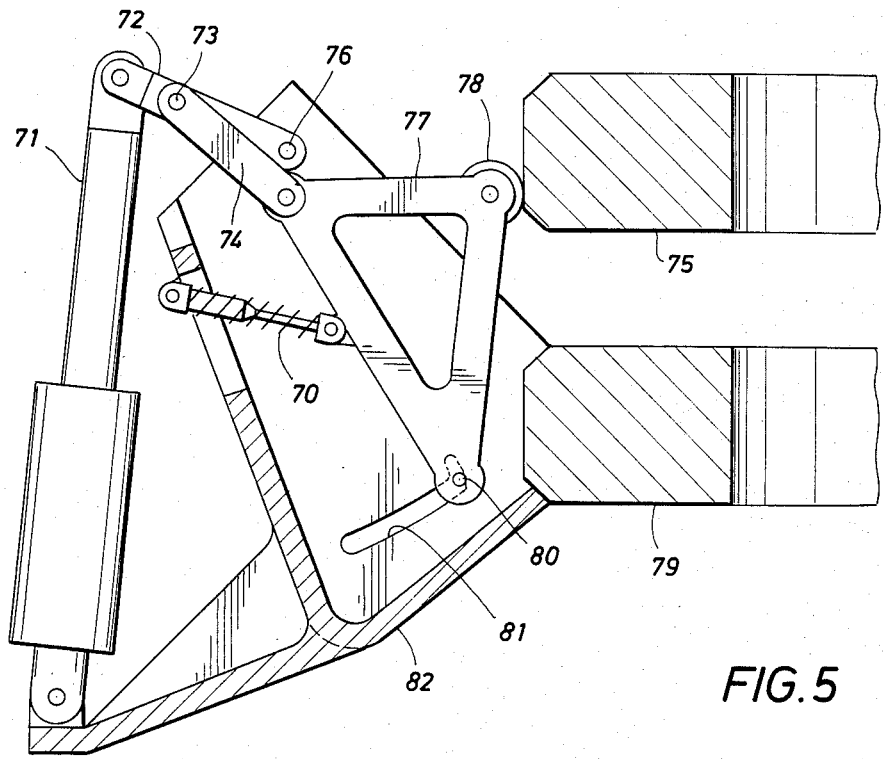
Figure 6:
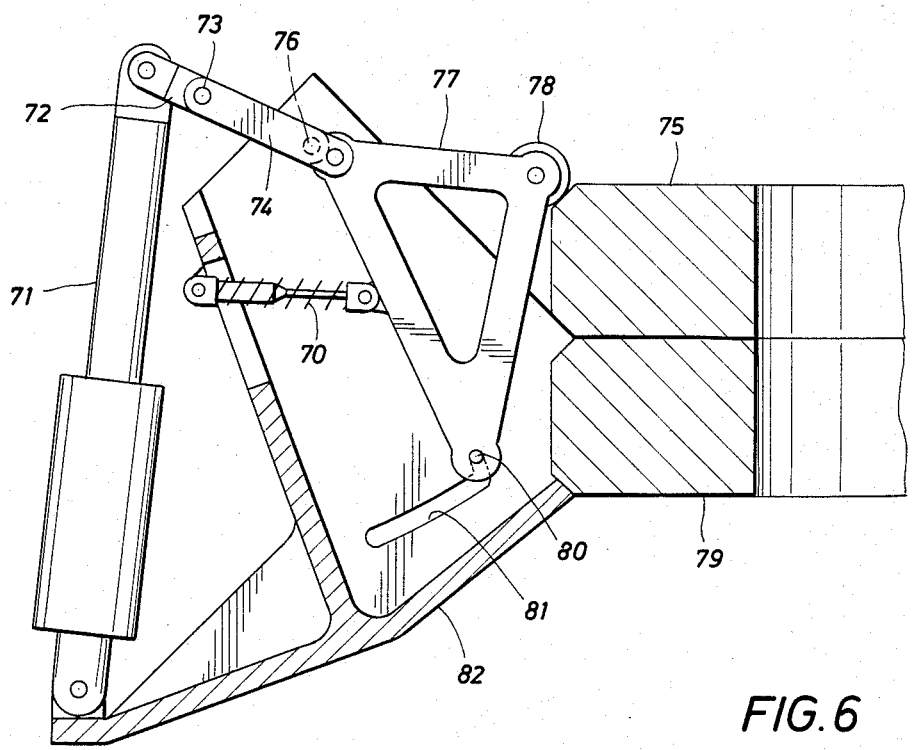
Figure 7:
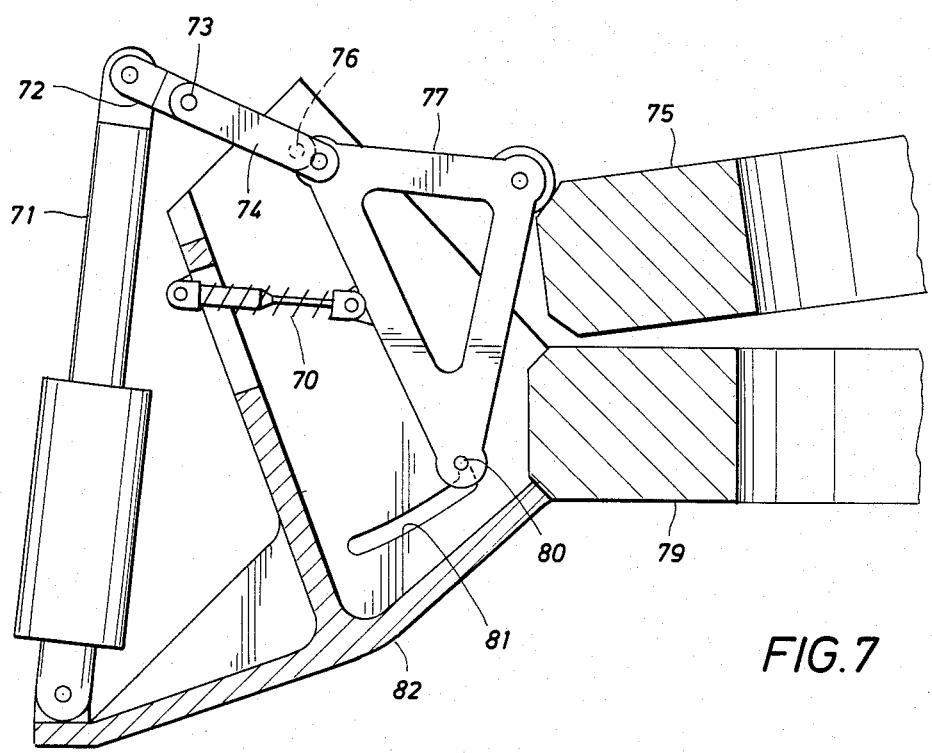
Figure 8:
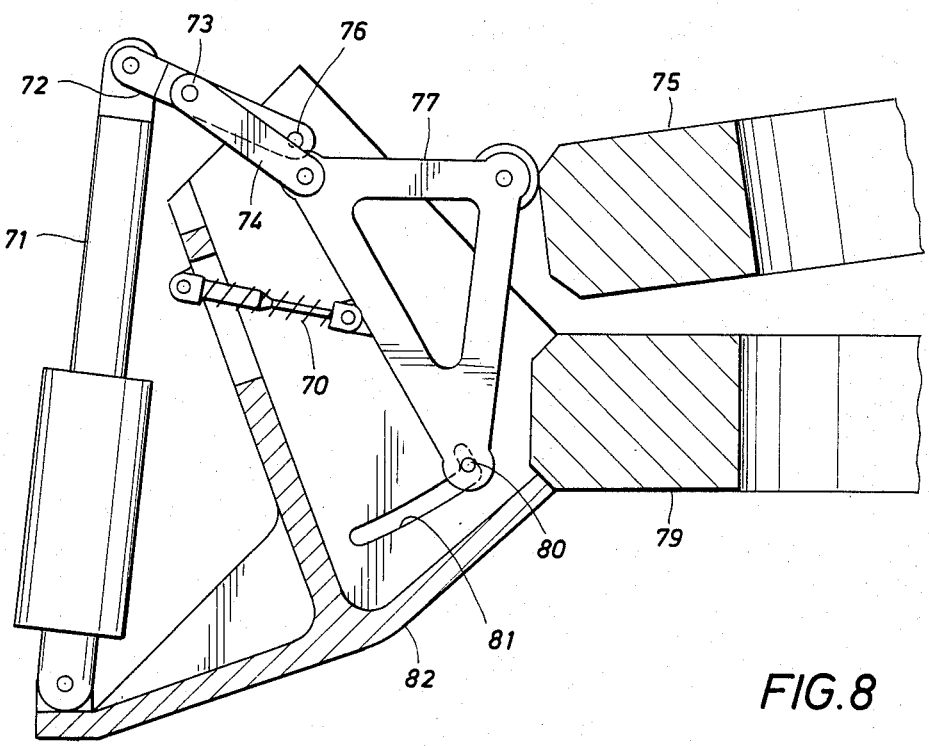

The angle between the back side of the main link 77 and the free link 74 is set so that the friction between the slider pin 80 and the slot 81 balances the forces from the free link 74 and the normally applied force, to keep the main link 77 from moving when a force is applied to the latch roller 78 from the normal direction as shown in FIG. 4. If a force is applied to the latch roller 78 from a direction counter clockwise from this direction and at an angle greater than the established trip angle, the frictional force on the slider pin 80 will be overcome and the latch will collapse, thus allowing the latched member 75 to pass the roller as seen in FIG. 5. When member 75 passes the roller, it is latched as shown in FIG. 6. At this point, the latch will remain locked until it is released by either moving the yoke 72 and the free link 74 to the released position with the actuator 71, as in FIGS. 11 and 12, or by tilting the latched member 75 as shown in FIGS. 7 and 8. The angle of tilt at which the latch will will automatically release may be changed by rotating the yoke 72 and the free link 74 to a new normal position. The tilt release angle establishes the yoke 72 and the free link 74 normal position and is not changed thereafter. If a different tilt release angle is desired, this would require a new latch.

Figure 9:
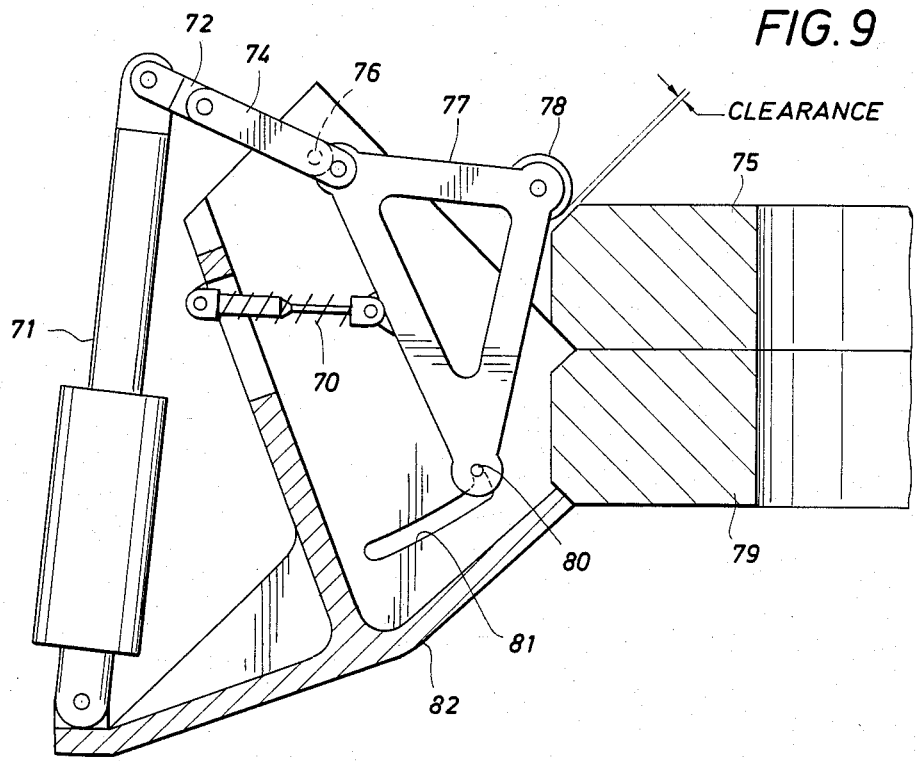
Figure 10:
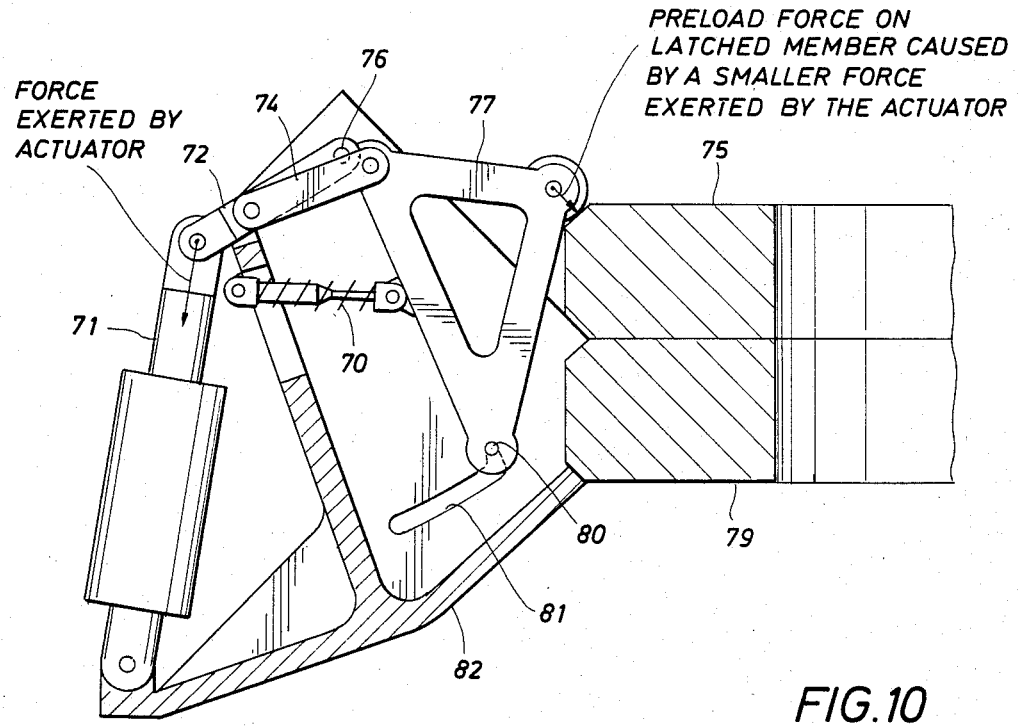
Figure 11:
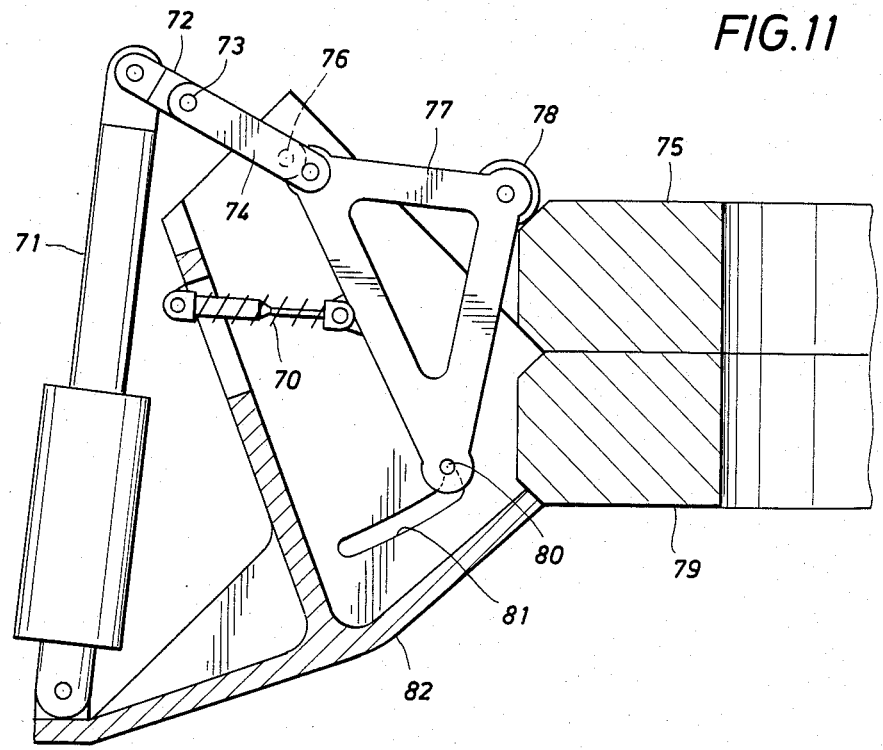
Figure 12:
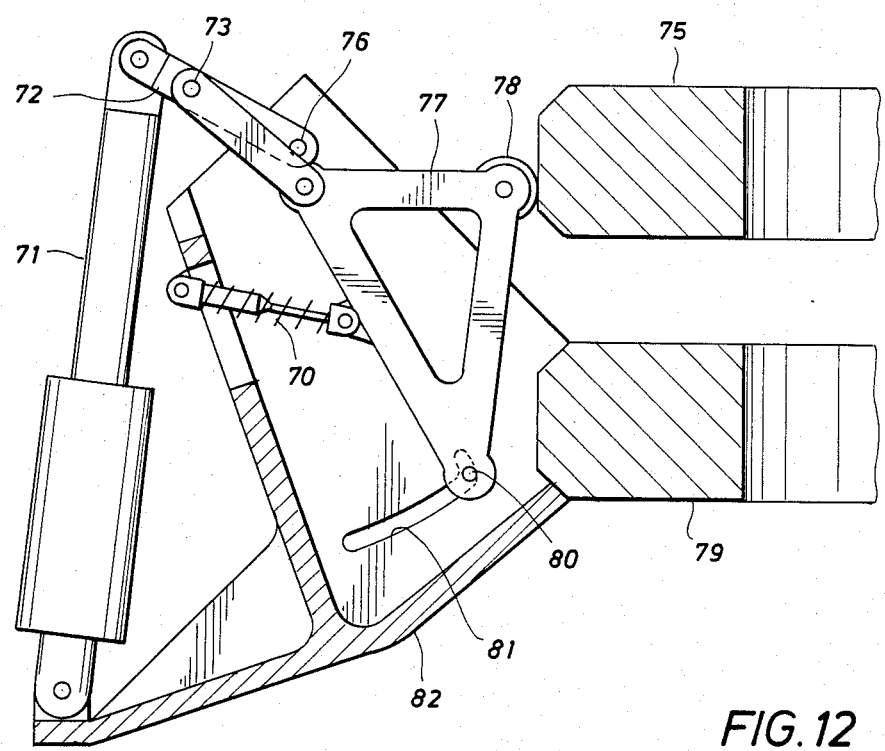

To ensure that the latch will lock when the latched member 75 passes the latch roller 78, a small amount of clearance is provided as seen in FIG. 9. Because the main link 77 pivots about the slider pin 80 in the upper portion of the slot 81 when closing, such clearance may be small. Normally a larger clearance will be provided, however, to balance any possible thermal distortions. The clearance may be removed and a preload force exerted by the latch roller 78 on the latched member 75 by rotating the yoke 72 counter clockwise about the yoke pivot point 76. The preload force exerted by the latch roller 78 is controlled by the force exerted by the actuator 71 on the yoke 72 as seen in FIG. 10.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. A preloadable vector sensitive latch, comprising: a housing, a main link slidably and pivotally connected directly to the housing, a yoke member, a free link directly connected to both the main link and the yoke member, and actuator means connected between the yoke member and the housing for changing the yoke position and for applying a force on the yoke to preload the latch.

2. The latch of claim 1 wherein the main link comprises a first, a second, and a third load application points.

3. The latch of claim 2 wherein the free link is directly connected to the first load application point of the main link.

4. The latch of claim 3 wherein the housing has a slot therein, and means associated with said slot for slidably and pivotally connecting the second load application point of the main link to the housing.

5. The latch of claim 3 wherein the housing includes a rigid primary member, an aligned latching member, a locking roller journalled to the third load application point of the main link, said aligned latching member being engageable by said locking roller.

6. The latch of claim 1 including bias means connecting the main link to a first portion of the housing.

7. A preloadable vector sensitive latch, comprising: a housing, a main link slidably and pivotally connected directly to the housing, a yoke member, a free link directly connected to both the main link and the yoke member, actuator means connected between the yoke member and the housing, and a return spring mechanism connecting the main link to a first portion of the housing.

8. A preloadable vector sensitive latch, comprising: a main link, a yoke member, a free link directly connected to both the main link and the yoke member, a housing, an actuator means connected between the yoke member and the housing, the housing having a slot therein, and means associated with said slot for slidably and pivotally connecting the main link to the housing.

9. A preloadable vector sensitive latch, comprising: a main link, a yoke member, a free link directly connected to both the main link and the yoke member, a housing, an actuator means connected to the yoke member to and the housing, a return spring mechanism connecting the main link to the housing, the housing having a slot therein, and means associated with said slot for slidably and pivotally connecting the main link to the housing.

10. A preloadable vector sensitive latch, comprising: a main link, a yoke member, a free link directly connected to both the main link and the yoke member, a housing, an aligned mating latching member, actuator means connected between the yoke member and the housing, a return spring mechanism connecting the main link to a first portion of the housing, the housing having a slot therein, means associated with said slot for slidably and pivotally connecting the main link to the housing, the housing including a rigid primary member, and a locking roller journalled to the main link, said locking roller being engageable with said aligned mating latching member.

11. A preloadable vector sensitive latch, comprising: a main link, a yoke member, a free link connected directly to both the main link and the yoke member, a housing, an aligned latching member, actuator means connected between the yoke member and the housing, the main link having a first, a second, and a third load application points, the free link being connected to the first load application point of the main link, bias means connecting the main link to a first portion of the housing, the housing having a slot therein, means associated with said slot for slidably and pivotally connecting a second load application point of the main link to the housing, the housing including a rigid primary member, and a locking roller journalled to a third load application point of the main link, said aligned latching member being engageable by said locking roller.

12. A latching system, comprising: a housing having a primary member attached thereto, an actuator means connected at one end to said housing, a free link, yoke means directly connected to both the actuator means and the free link, a main link directly interconnected with the free link, bias means extending between the main link and the housing, roller means on said main link, a slot in said housing, and a slider pin associated with the main link and extending into said slot for slidably and pivotally connecting the main link with respect to the housing.

13. The combination of a free floating alignable mating latching member and a latching system comprising a housing having a primary member attached thereto, an actuator means connected at one end to said housing, a free link, yoke means directly connected to both the actuator and the free link, a main link directly interconnected with the free link, bias means extending between the main link and the housing, roller means on said main link, a slot in said housing, and a slider pin associated with the main link and extending into said slot for slidably and pivotally connecting the main link with respect to the housing.

14. A preloadable vector sensitive latch, comprising:
   latching members, said latching members further comprising
   a latched member,
   a mating primary member having a housing,
   a main link slidably and pivotally connected to the housing,
   a yoke member,
   a free link directly connected to both the main link and the yoke, and
   means for removing clearance between the latching members and for preloading the latching members to prevent their separation when their alignment is within a preselected angular limit and for automatically releasing them when their alignment is outside said angular limit, said means including actuator means connected to both the yoke member and to the housing for preloading and releasing the latched member.

* * * * *